Patented Oct. 17, 1922.

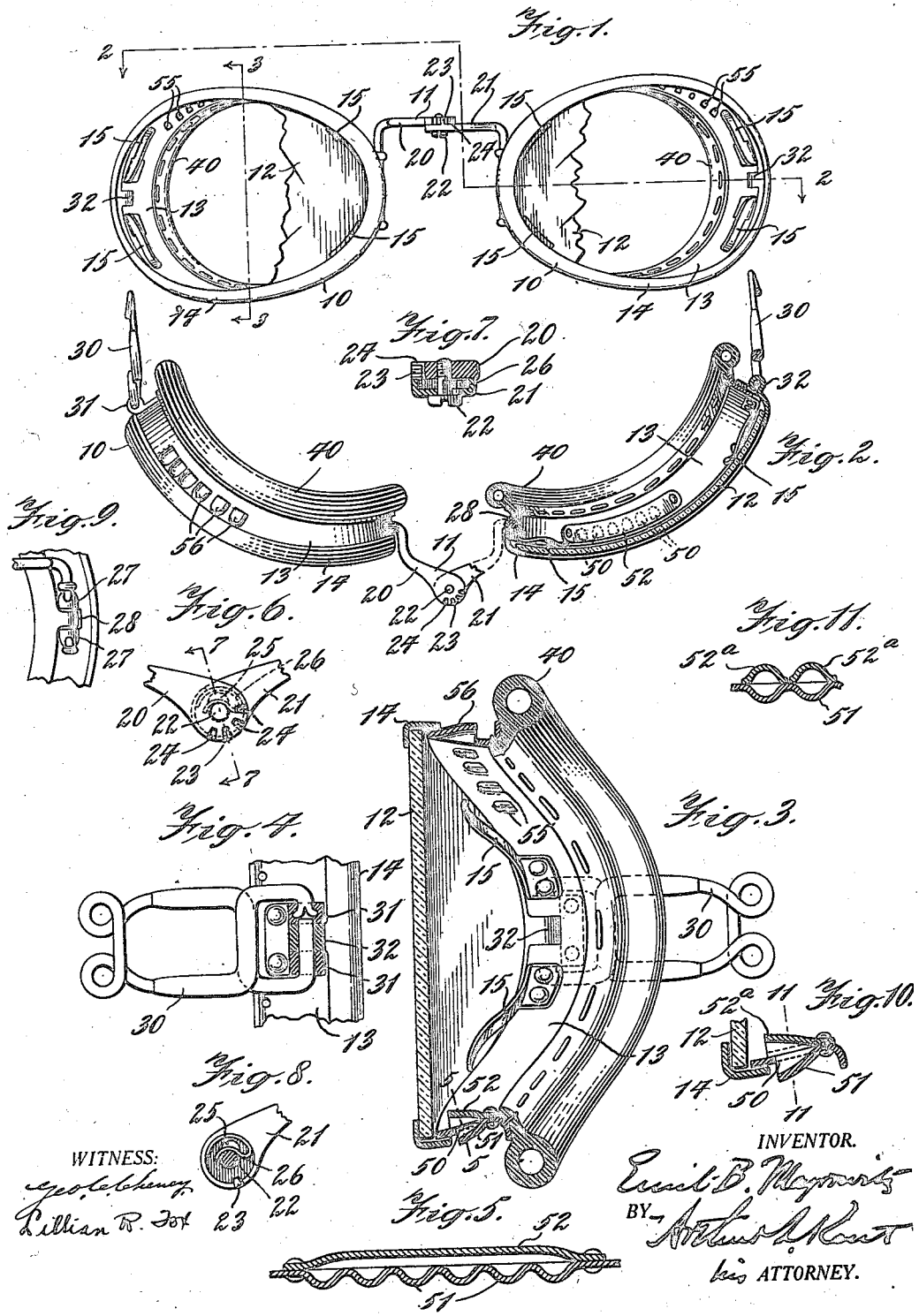

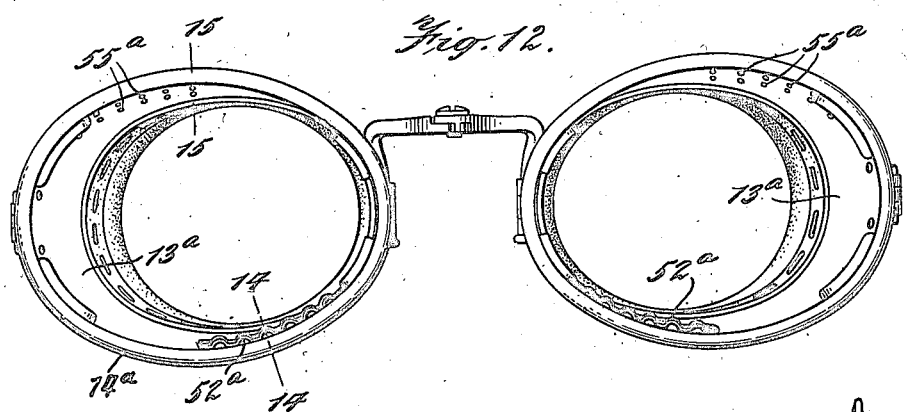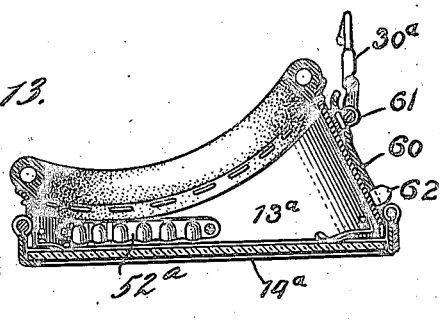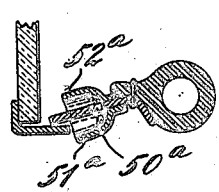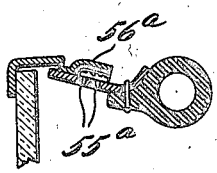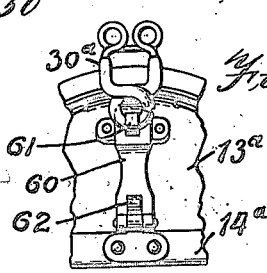

1,432,406

UNITED STATES PATENT OFFICE.

EMIL B. MEYROWITZ, OF RIDGEFIELD, NEW JERSEY.

GOGGLES.

Application filed November 9, 1918. Serial No. 261,767.

*To all whom it may concern:*

Be it known that I, EMIL B. MEYROWITZ, a citizen of the United States, residing at Ridgefield, in the county of Bergen and State of New Jersey, have invented certain new and useful Improvements in Goggles, fully described and represented in the following specification and the accompanying drawings, forming a part of the same.

This invention relates to goggles or eye protecting glasses intended especially for the use of aviators and motorists. The invention aims generally to improve the construction of goggles and to provide an article of this kind which shall meet to a high degree all requirements of efficient protection of the eyes of the wearer, convenience in use and adjustment, and comfort and avoidance of harm to the wearer, combined with lightness, strength and simplicity of construction. More particularly, the invention aims among other things to provide improved means for holding the lenses in place, permitting ready removal and replacement of the lenses; to provide improved means for ventilating the space within the eye cups; to provide an adjustable bridge or nose-piece which is readily adjustable to give a wide range of interpupilary adjustment, that is, of adjustment of the two eye-pieces or unit members of the goggles toward or from each other to adapt the goggles to persons having their eyes set at different distances apart; and to increase the range of vision of the wearer by the use of lenses of greater curvature, or of less radius of curvature, than are used in goggles as heretofore constructed. Other objects and advantages of the invention, and the construction and features whereby such objects are secured, will appear from the following description.

A full understanding of the invention can best be given by a detail description of a construction embodying the various features of the invention in the form now considered best, and such a description will now be given in connection with the accompanying drawings showing such a construction and certain modifications thereof: In said drawings:—

Fig. 1 is a front view of a pair of curved lens goggles embodying the various features of the invention in the form now considered best;

Fig. 2 is a view taken partly in plan and partly in section on line 2—2 of Fig. 1;

Fig. 3 is an enlarged sectional view taken on line 3—3 of Fig. 1;

Fig. 4 is a detail view partly in section and on the scale of Fig. 3 of a portion of the end of one of the eye-pieces or units and the attachment for connecting a head strap or band thereto;

Fig. 5 is a detail sectional view taken on line 5—5 of Fig. 3;

Fig. 6 is a detail top or plan view of the adjustably connected ends of the two arms forming the nose-piece or bridge;

Fig. 7 is a section taken on line 7—7 of Fig. 6;

Fig. 8 is a detail view of the end of one of the bridge arms with the pivot shown in section;

Fig. 9 is a detail view of the hinge connection between the main frame member and the lens-holding rim of one of the units;

Fig. 10 is a detail sectional view of a modification of the air inlet construction;

Fig. 11 is a detail section taken on line 11—11 of Fig. 10;

Fig. 12 is a front view of a pair of flat lens goggles made in accordance with the invention;

Fig. 13 is a view partly in plan and partly in section as in Fig. 2 of the goggles shown in Fig. 12;

Figs. 14 and 15 are enlarged detail sectional views taken on lines 14—14 and 15—15 respectively of Fig. 12; and Fig. 16 is a detail end view looking from the left of Fig. 13.

Referring to the drawings, and first to Figs. 1 to 9, the device shown is made up as usual of a pair of eyepieces or units 10, usually termed eye cups, connected by a nose-piece or bridge 11. Each eye cup comprises a lens, or transparent pane, 12 of glass or other suitable transparent material, and a frame to extend about the eye of the wearer and by which the lens is supported in desired position. Each frame comprises a main frame member 13 and a flanged lens-holding rim 14. The frame member 13 is of a form corresponding to the shape of the lens, usually of approximately oval form, and made of suitable sheet metal or other suitable rigid and strong material, and of a suitable depth to support the lens at proper distance from the eye of the wearer. When the lens is curved in the direction of its major axis, or horizontally when in position, as in the construction shown in these figures, the frame member 13 and lens rim 14 are correspondingly curved horizontally as shown, and the frame member 13 is desirably made of approximately uniform depth throughout so that the curvature of the plane of its inner edge shall be concentric to the curvature of its outer or lens supporting edge or approximately so, and is formed to flare outwardly at its outer end. I find it desirable to employ lenses of greater curvature than have, so far as I know, been heretofore used in goggles, and the present construction has been made with the idea of using such lenses of relatively small radius of curvature. The advantage of using such a lens set in a frame such as described is that an increased horizontal angle or field of vision is thereby secured, and I consider it most desirable to use a glass of a curvature of approximately two inch radius as I find that such a lens set as stated is most satisfactory in affording a relatively extended field of vision without entailing difficulties or objectionable features in the construction and dimensions of the goggles.

The lens is positioned with its edge extending over the outer edge of the frame member 13 and is held in place by the inwardly extending flange of the rim 14, the rearwardly extending flange of the rim extending about and closely adjacent the outer edge portion of the frame member 13. To provide for convenient removal and replacement of the lens, the rim 14 is pivotally connected to the frame member 13 at its inner or nose end and is provided with securing means for holding it in place when in its closed or lens-holding position. With this construction, the lens may be removed by simply releasing the rim 14 from its securing means and swinging it out away from the frame member 13, the lens being then lifted out of the rim; and to place a lens in position it is simply placed in the rim when the latter has been swung away from the main frame member, and the rim is then swung back to its normal or closed position and secured.

Different lenses are likely to differ slightly in thickness and curved lenses are likely to vary slightly in curvature. In order to adapt the frames to receive and hold securely without rattling lenses varying somewhat in thickness and, in the case of curved lens goggles, varying slightly in curvature, the frames are provided with yielding resilient cushion means to bear against the lens and hold it in place against its seat. In the construction shown, a plurality of springs 15 are provided extending from the inner face of the frame member 13 in position to bear at suitable points against the inner face of the lens adjacent its edges and hold the lens in position seated against the flange of the rim 14. A lens of such thickness or curvature as would otherwise be so loosely held as to rattle will thus by pressure of the springs 15 be held securely in place and prevented from rattling in a frame which is adapted to receive somewhat thicker lenses and lenses not quite true to the intended curvature.

The rim 14, of metal or other suitable material, is made relatively shallow, being most desirably of only sufficient depth to slightly overlap the outer edge portion of the frame member 13, thus permitting the frame member 13 to be made of radial or flaring form at its outer end without losing the desirable close fit between the rim and frame member. It is desirable that the frame flare outwardly at its outer end in order to increase the angle of vision, and, in curved lens goggles, to secure the full advantage of the curved lens, and especially with lenses of such degree of curvature as hereinbefore referred to. The rim is desirably made of material of such thickness that its inwardly extending flange shall have a slight degree of flexibility so that it may accommodate itself somewhat to slight variations in the outer surface of the lens, giving a more even bearing pressure on the lens than would be the case if the rim flange were made absolutely rigid.

The nose piece or bridge 11 by which the two eye cups are connected is made to permit of a relative adjustment of the eye units or cups toward and from each other so that the device may be suited to wearers having their visual axes more or less widely spaced. For this purpose, the bridge is formed in two parts, each pivotally connected to one of the eye units and connected to each other by a connection formed to prevent relative angular adjustment of the arms whereby their ends connected to the eye units may be brought closer together or moved further apart and the eye units thereby correspondingly adjusted toward or from each other without otherwise changing their relative positions.

Most desirably, and as shown, the bridge is formed by two arms 20 and 21 the outer ends of which are pivotally connected one to each of the eye units with their pivotal axes vertical, said arms extending forward and being connected together by an adjustable hinge connection the axis of which is also vertical and therefore parallel with but out of line with the axes of pivotal connection of the arms with the eye units. The meeting ends of the arms are formed with bearing faces and are connected and held together by a pivot screw 22. One of the arm ends, as the end of the arm 21, is provided with a lug or tooth 23, and the end of the other arm 20 is formed with a series of recesses 24 into one or another of which the lug 23 extends according to the adjustment of the arms, and holds the arms against relative turning movement. To permit adjustment of the arms when desired, the opening 25 for the pivot 22 in the end of one of the arms, as 21, is made somewhat elongated in the direction away from the lug 23 so as to permit the end of this arm to be moved relatively to the end of the other arm to carry the lug out of the notch in the arm 20 with which it has been engaged, thereby permitting the arms to be turned to bring the lug opposite any other desired notch. A spring 26 housed in a recess in the end of the arm 21 bears against the pivot and normally holds the ends of the arms in position with the pivot in the end of the elongated opening 25 toward the lug 23 and the lug entered into one or another of the notches 24 according to the angular adjustment of the arms. The arms will thus be held locked in any position of angular adjustment to which they have been turned, but may be readily adjusted to any other desired position determined by the notches 24 by simply applying pressure to the arms in the direction to move the lug 23 out of the notch with which it is in engagement and then turning the arms as desired and releasing them to permit the spring 25 to return them to the position in which the lug enters the notch then opposite it. The arms are held rigidly in any desired position of angular adjustment and the adjustment is easily changed as desired without the employment of any clamping or setting device requiring independent manipulation. By this construction, the eye units are held against relative vertical displacement while being free to swing horizontally to seat properly against the face of the wearer.

The bent outer or free ends of the bridge arms 20 and 21 extend in the construction shown through lugs 27 formed on the frame members 13 and also through hinge lugs 28 formed on the lens holding rims 14, thereby serving as the pivot pins not only for the pivotal connections of the bridge to the eye units, but also for the pivotal connections of the rims 14 to the frame members 13. By suitably forming the hinge lugs 27 and 28 as shown all parts of such hinge connections may be located within the periphery of the cup so that there is no part which might be forced into harmful contact with the wearer's nose.

The outer end of each eye unit is provided with a swinging link or connecting piece 30 for receiving the end of the usual head strap or band which extends about the head of the wearer to hold the goggles in position. These links serve also, in the construction shown, as catches for securing the lens-holding rims 14 in closed position. For this purpose each frame member 13 is provided at its outer end with a pair of lugs 31 and the rim 14 carries at its outer end a lug 32 which extends between the lugs 31 when the rim is in its closed position, and the lugs are eye lugs, being formed with openings which register when the rim is in closed position so as to receive the ends of the link 30. Each of the links 30 is formed of a thin rod or wire bent to form a link with the ends of the rod turned inward toward each other at one end of the link so that by separating such ends they may be entered into the openings in the lugs 31 and 32. At least a portion of the rod which forms the closed end of the link is of steel or other suitable spring material and such portion is most desirably bent to form two single coils as shown so as to give a greater range of movement to the ends of the rod at the open end of the link. Instead of forming the link entirely of steel or other spring material, the portions of the rod forming the main part of the link are most desirably made of other suitable material such as brass, and in order that the link may be opened by pressure instead of requiring that the sides be pulled apart to separate the ends, the portions of the rod forming the two sides of the link are each formed with reverse bends as shown in Fig. 4, so that by pressing on the sides of the link the ends of the rod at the open end of the link will be separated against the tension of its closed spring end. Instead of having the bent ends of the link which enter the lugs 31 and 32 of equal length so that both will extend into the opening in the central lug 32, I form one such bent end relatively long so that it may pass clear through the opening in the rim lug 32 and extend slightly beyond the same into the opening of the lug 31 on the other side, and the other bent end is made relatively short so as to extend only part way through the opening in one of the lugs 31, and I secure this short link end in position in this lug by suitable means which will hold it against withdrawal without preventing swinging movement of the link. For this purpose in the construction shown the opening in the lug is formed with an annular groove and the short link end is expanded to enter such groove, as clearly shown in Fig. 4. With this construction, pressing the sides of the link together will serve to withdraw the long end of the link to release the lug 32, but the link is prevented from becoming detached from the frame member 13, and having the long end of the link extend clear through the opening in the lug 32 and engaging the lugs 31 on both sides of the lug 32 provides a firmer securing means for the rim than would otherwise be had.

The rearward edge of the frame members 13 may be provided with any suitable cushion means for bearing against and making close contact with the face of the wearer. Cushions formed of small rubber tubing with a longitudinal flange by which the tubing is secured to the eye cup have been used for this purpose, but the arrangement for securing the same to the eye cup has not been entirely satisfactory. As shown in the drawings, the rearward or inner edge of the frame member 13 is turned or flanged outward and the cushion strip is secured to the inner face of the frame member so as to seat against such flanged edge. Any suitable form of cushion strip might be employed, but I consider a comparatively thick walled rubber tubing 40 of suitable size with a flange or flat strip extending from one side thereof most suitable for the purpose. This rubber cushion strip is secured in position as shown with its flange extending inward against the inner face of the flanged edge portion of the frame member 13, usually by stitches extending through openings provided in the frame member. With the cushions so secured, if the goggles are forced against the face of the wearer by a sudden blow or otherwise the cushions will always protect the wearer's face from direct contact with the metal of the frame members 13; and forming the frame member 13 with a flanged edge not only provides a suitable support for the cushion not likely to cut through the cushions, but avoids the presence of any sharp edge which might strike the wearer's face under any circumstances.

With goggles which fit closely against the face of the wearer it is desirable and practically necessary to provide for efficient ventilation of the chambers within the eye cups, both for the comfort of the wearer and in order to avoid condensation of moisture on the inner side of the lens. I have provided improved means for securing this necessary ventilation. Such means includes two series of air openings in the wall of the frame member 13, one series being formed to direct air into the cup chamber and the other for the discharge of air therefrom; and the intake openings are formed or provided with means whereby a current of air will be caused to enter the chamber but will be directed forwardly toward the inner surface of the lens and a draft against the wearer's eye prevented.

In the construction shown in Figs. 1 to 9, the frame member 13 has formed in one side thereof a series of air inlet openings 50 indicated by dotted lines in Fig. 2 and one appearing in Fig. 3. These openings are provided with a deflector or deflectors 51 so as to form a forwardly opening intake through which air will be forced into the cup chamber by the passing current of air when the goggles are in use. Such deflectors may be formed in various ways but are conveniently formed by metal displaced from the openings 50 as shown in Fig. 3. The air entering through the openings 50 is deflected forwardly and directed against the inner face of the lens by a deflector which may be a plate 52 secured to the inner side of the frame member 13 and extending over a series of openings 50 as shown in Figs. 2, 3 and 5, or a crimped plate or series of separate deflectors 52ª as shown in Figs. 10 and 11, or other suitable deflecting means might be provided. Air caused to enter through the openings 50 as the goggles are advanced through the atmosphere on the face of the wearer is thus discharged forwardly within the cup chamber and directed against the inner surface of the lens, and the possibility of any direct draft against the wearer's eye is prevented. In the wall of the frame member 13 at the other side of the cup there is a series of outlet or discharge openings 55, and these openings are formed so as to open outward in a rearward direction so that the air movement past the goggles when in use will tend to draw air from the interior of the cup through these openings. These outlet openings are conveniently formed as indicated in Fig. 3 by suitably cutting and displacing the metal at the openings to form rearwardly opening hoods 56, or such hoods, as is apparent from Fig. 2, might be formed separately and attached to the outside of the frame member. Obviously, also, a single outside plate might be provided extending over the whole series of outlet openings 55.

Figs. 12 to 16 show a pair of goggles embodying certain of the features of the goggles shown in Figs. 1, 2 and 3, but formed for and provided with flat lenses. The main frame members 13ª have their rearward edges in a curved plane to fit the face of the wearer, but their front edges and the lens-holding rims 14ª are shaped to receive flat lenses, the frames 13ª being thus of increased depth at their outer ends. The construction providing the ventilating openings also differs slightly from the construction already described and illustrated in the other figures. As shown in these figures and in detail in Figs. 14 and 15, the inlet openings 50ª and the outlet openings 55ª are simply plain openings extending through the walls of the frame members, and the inner and outer deflectors for the inlet openings are both formed by suiably stamped metal plates 51ª and 52ª secured to the wall of the frame member, and the hoods for the outlet openings are also formed by suitably stamped plates 56ª secured to the frame member wall.

The means for securing the lens-holding rims in closed position and for connecting the head bands to the eye units also differs from the means already described for this purpose and shown in the other figures. As shown in these figures, each lens-holding rim 14ᵃ is provided with a pivoted latch 60 adapted to be turned inward against the end of the frame member 13ᵃ when the lens-holding rim has been swung into closed position. The end of the latch is formed with an opening to receive an eye stud 61 on the frame member, to which stud the connecting piece or link 30ᵃ on the end of the head band is detachably connected for the purpose of securing the end of the head band to the eye unit and for locking the latch 60 in closed position. The links 30ᵃ may be of any suitable construction. As shown, they are spring links similar to the links 30 of Figs. 1 to 4 except that one of the rod ends is made somewhat hook shaped to engage in the eye stud 61 and the other rod end is made shorter, serving merely as a keeper to prevent unintended detachment of the link from the eye stud. A stud 62 is also desirably provided on each frame member to enter an opening in the latch 60, and, being suitably shaped therefor as shown, to serve as a cam for drawing the lens-holding rim to its closed position. Besides being convenient and easy of manipulation, this arrangement has the advantage, especially in a flat lens form of goggle in which the frame members are of considerable depth at their outward flaring ends, that the pull of the head band on the eye units is from points where the tendency to swing the units out of proper position with relation to the eyes of the wearer is much less than it would be if the ends of the head band were connected to the extreme outer portions of the eye units.

Both the curved lenses of Figs. 1 to 3 and the flat lenses of Figs. 12 and 13 are shown as merely pieces of glass, or it might be other suitable transparent material, of uniform thickness throughout. It is of course to be understood, however, that lenses having relatively curved surfaces of any desired character may be used, one object of the invention being to provide for the ready removal and replacement of lenses of various kinds. It is to be understood, also, that while the term "lens" in its more strict sense implies a piece or plate of glass or other suitable material of varying thickness, yet this term as used herein in the specification and claims is intended to include a plate or sheet of glass or other suitable material of uniform thickness throughout.

What is claimed is:

1. Goggles having eye units each comprising a frame having lens-holding means bearing against one side of the lens and normally secured in lens-holding position and releasable to permit removal and replacement of the lens, and provided with yielding resilient means for bearing against the other side of the lens when the holding means is in its closed position to hold the lens in position and prevent rattling.

2. Goggles having eye units each comprising a frame member, a lens-holding rim pivotally connected to the frame member, releasable securing means for holding said rim in closed position, and yielding resilient means to bear against the lens and press it against said rim when said rim is in its closed position.

3. Goggles having eye units each comprising a frame member, a lens-holding rim between which and said frame member the lens is loosely held and which is movable from its holding position on said frame member to permit removal and replacement of the lens, and a plurality of springs secured to said frame member to bear against the lens when said rim is in holding position to prevent the lens from rattling.

4. Goggles having eye units each comprising a frame member, a lens-holding rim pivotally connected at its inner end to said frame member, and a link for connecting a head band to the outer end of the unit formed to secure said rim releasably in its closed position.

5. Goggles having eye units each comprising a frame member, a lens-holding rim pivotally connected at its inner end to said frame member and having an eye-piece at its outer end, and a link for connecting a head band to the outer end of said frame member having a spring-held end engaging the eye piece of said rim to hold said rim releasably in closed position.

6. An eye unit for goggles, comprising a frame member, a lens-holding rim pivotally connected at its inner end to said frame member, one of said parts having an eye lug at its outer end extending between eye lugs on the other of said parts when the rim is in closed position, and a head band connecting piece formed by a spring link having rod ends connected to the sides of the link by reverse bends and separable by pressing the sides of the link toward each other, said ends extending into said eye lugs to connect the link to said frame member and to hold said rim releasably in closed position.

7. An eye unit for goggles, comprising a frame member, a lens-holding rim pivotally connected at its inner end to said frame member and having an eye lug at its outer end extending between eye lugs on said frame member when the rim is in closed position, and a head band connecting piece formed by a spring link having rod ends connected to the sides of the link by reverse bends and separable by pressing the sides of the link toward each other, one of said ends being secured to swivel in one of the eye lugs on said frame member and the other of said ends extending through the other eye lug on said frame member and into the eye lug of said rim to hold the rim in closed position and withdrawable to release said rim.

8. Goggles comprising a pair of eye units, and a bridge to which the eye units are pivotally connected, said bridge being formed of two parts which are angularly adjustable to vary the distance between the eye units.

9. Goggles comprising a pair of eye units, and a bridge to which the eye units are pivotally connected to swing about vertical axes, said bridge being formed of two parts which extend forward from the point of connection to the eye units and which are hinge-connected together to be angularly adjustable about an axis parallel to the axes of pivotal connection of the eye units to the bridge, whereby the distance between the eye units may be varied.

10. Goggles comprising a pair of eye units, and a bridge to which the eye units are pivotally connected, said bridge being formed of two pivotally connected arms provided with interlocking means for holding them against relative turning movement, said arms being relatively movable transversely of their pivotal axis to disengage their interlocking means and permit angular adjustment of the arms for varying the distance between the eye units and being normally spring-held in position with their interlocking means engaged.

11. Goggles comprising a pair of eye units each comprising a frame member and a lens-holding rim provided at their inner ends with hinge lugs, and a bridge having pivot forming ends extending one through the hinge lugs of each eye unit, whereby the eye units are pivotally connected to the bridge and the lens-holding rim of each eye unit is pivotally connected to its frame member.

12. Goggles comprising a pair of eye units each having a frame member having at its rear edge a flange formed to present a relatively broad bearing surface toward the face of a wearer of the goggles, and a cushion strip secured to the inner surface of the frame member to seat against the bearing surface of said flange.

13. An eye unit for goggles, having a series of air inlet openings in the side wall thereof, outside deflecting means for directing air to said openings and inside deflecting means spaced from the lens for directing air from said openings forwardly toward the lens, and a series of air outlet openings in the side wall at the opposite side of the eye unit from the inlet openings.

14. Goggles having eye units each comprising a horizontally curved main frame member formed to flare outwardly at its outer end, a relatively shallow horizontally curved lens-retaining rim pivoted to the main frame member at its inner end, releasable securing means for holding the rim in closed position, a horizontally curved lens held between the main frame member and the rim, and yielding resilient means bearing against the inner side of the lens when the rim is in its closed position.

In testimony whereof I have hereunto set my hand in the presence of two subscribing witnesses.

EMIL B. MEYROWITZ.

Witnesses:
EDWARD MEYROWITZ,
M. M. ANDERSON.